United States Patent [19]

Ozeki

[11] Patent Number: 5,125,071
[45] Date of Patent: Jun. 23, 1992

[54] COMPUTER COMMAND INPUT UNIT GIVING PRIORITY TO FREQUENTLY SELECTED COMMANDS

[75] Inventor: Masayoshi Ozeki, Wakamatsucho, Japan

[73] Assignee: Hitachi, Ltd., Tokyo, Japan

[21] Appl. No.: 666,570

[22] Filed: Mar. 8, 1991

Related U.S. Application Data

[63] Continuation of Ser. No. 93,478, Sep. 4, 1987, abandoned.

[30] Foreign Application Priority Data

Sep. 10, 1986 [JP] Japan .................. 61-211539

[51] Int. Cl.⁵ .................................................. G06F 3/00
[52] U.S. Cl. ............................ 395/100; 364/927.2; 364/927.7; 364/928; 364/928.2; 364/DIG. 2
[58] Field of Search ... 364/200 MS File, 900 MS File

[56] References Cited

U.S. PATENT DOCUMENTS

| | | | |
|---|---|---|---|
| 3,956,739 | 5/1976 | Ophir et al. | 340/172.5 |
| 4,247,208 | 1/1981 | Fulkerson et al. | 400/194 |
| 4,386,834 | 6/1983 | Toolan | 354/3 |
| 4,418,344 | 11/1983 | Brown | 340/726 |
| 4,680,729 | 7/1987 | Steinhart | 364/900 |
| 4,736,309 | 5/1988 | Johnson et al. | 364/521 |
| 4,746,206 | 5/1988 | Kusztos et al. | 350/605 |
| 4,823,311 | 4/1989 | Hunter et al. | 364/900 |

Primary Examiner—Thomas C. Lee
Assistant Examiner—Robert B. Harrell
Attorney, Agent, or Firm—Antonelli, Terry Stout & Kraus

[57] ABSTRACT

A number of predetermined commands for a computer are divided into a plurality of groups depending upon their priority. The commands are successively displayed in the groups. The selected commands are put into a group having the highest priority for display, so that the commands having a high frequency of use are displayed in the first display group. This is accomplished by the provision of a memory table which stores data that divides the commands into groups depending upon their priority for display, a command display device which successively displays the commands in their groups according to the priority display order in response to display instructions that are input successively and based upon the data stored in the memory table, a command operation unit which initiates execution of the commands in response to the selection of the displayed commands, and a priority order renewal unit which renews the memory table such that executed commands are put into the group having the highest priority.

10 Claims, 12 Drawing Sheets

|  |  | DISPLAY PRIORITY ORDER | | |
|---|---|---|---|---|
|  |  | 1 | 2 | 3 |
| FUNCTION KEY | F 1 | COM 1 | COM 2 | COM 3 |
|  | F 2 | COM 4 | COM 5 | COM 6 |
|  | F 3 | COM 7 | COM 8 | COM 9 |
|  | F 4 | COM 10 | COM 11 | COM 12 |
|  | ⋮ | ⋮ | ⋮ | ⋮ |
|  | F 16 | COM 46 | COM 47 | COM 48 |

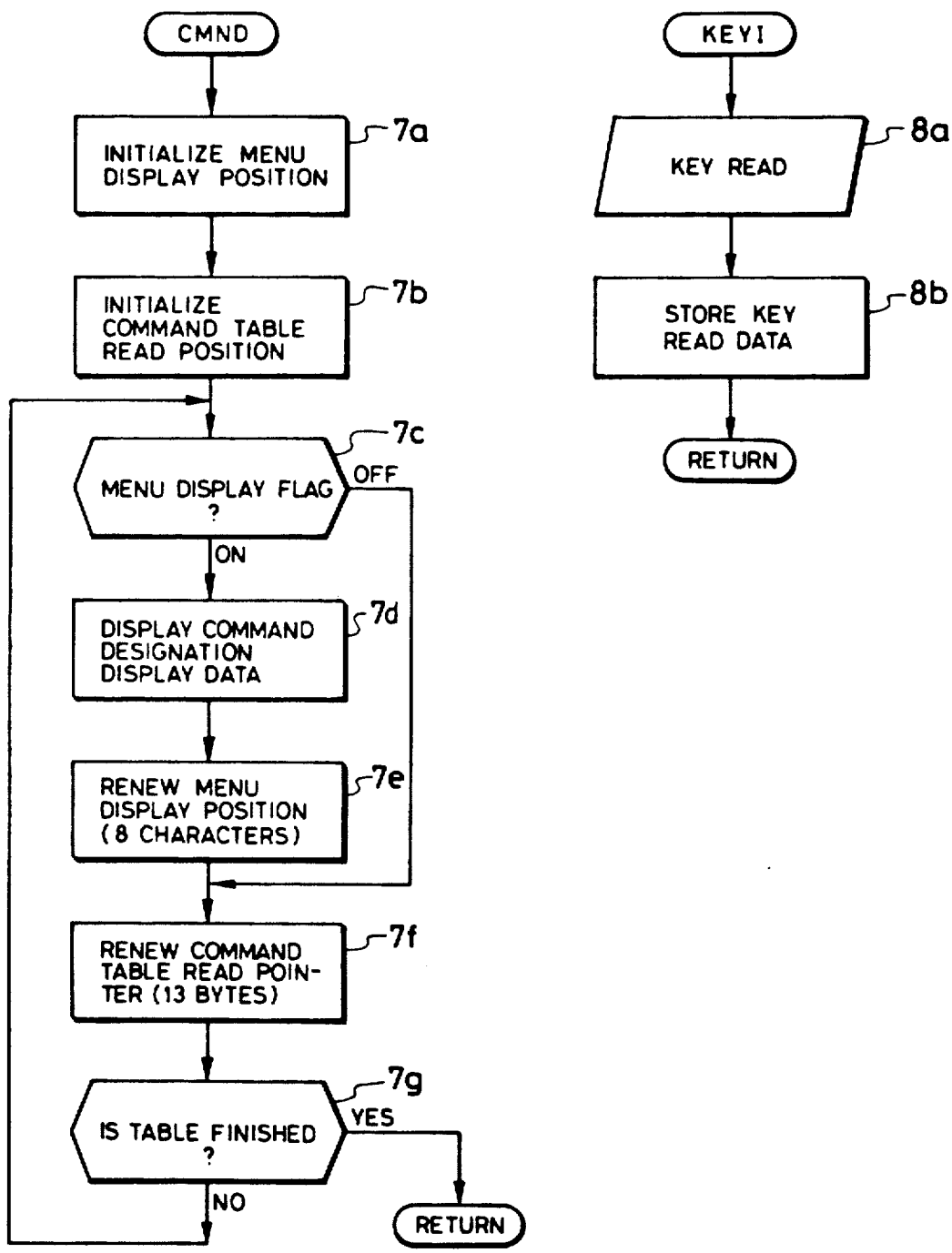

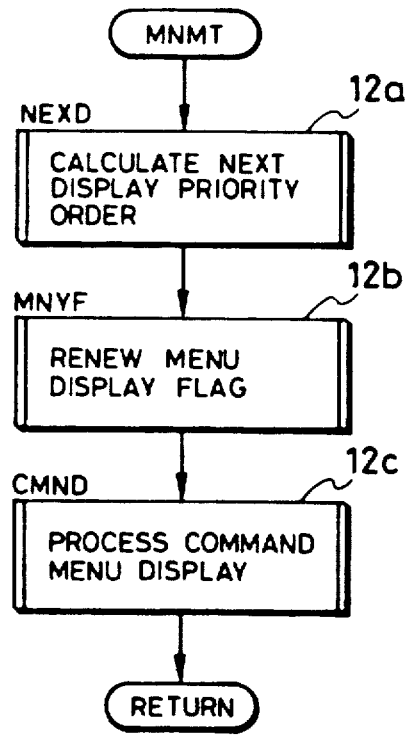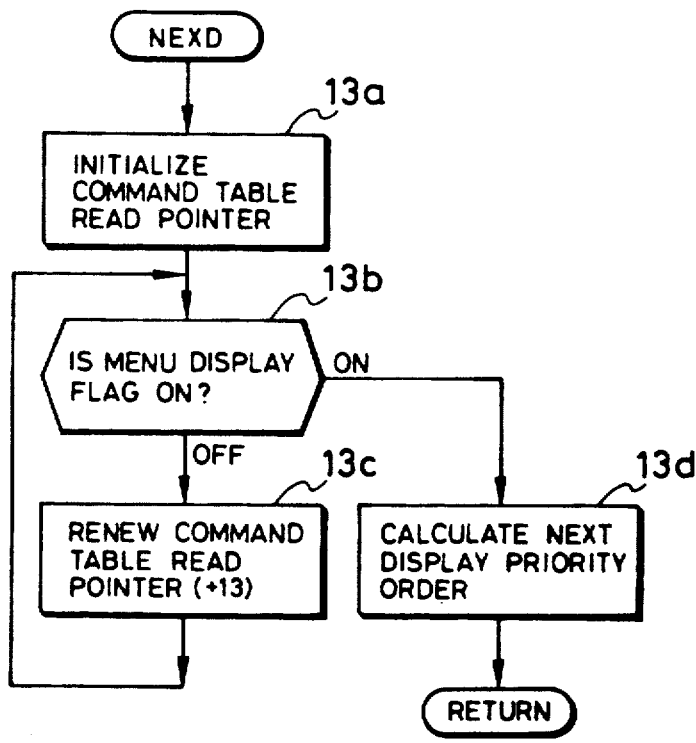
FIG. 12
FIG. 13

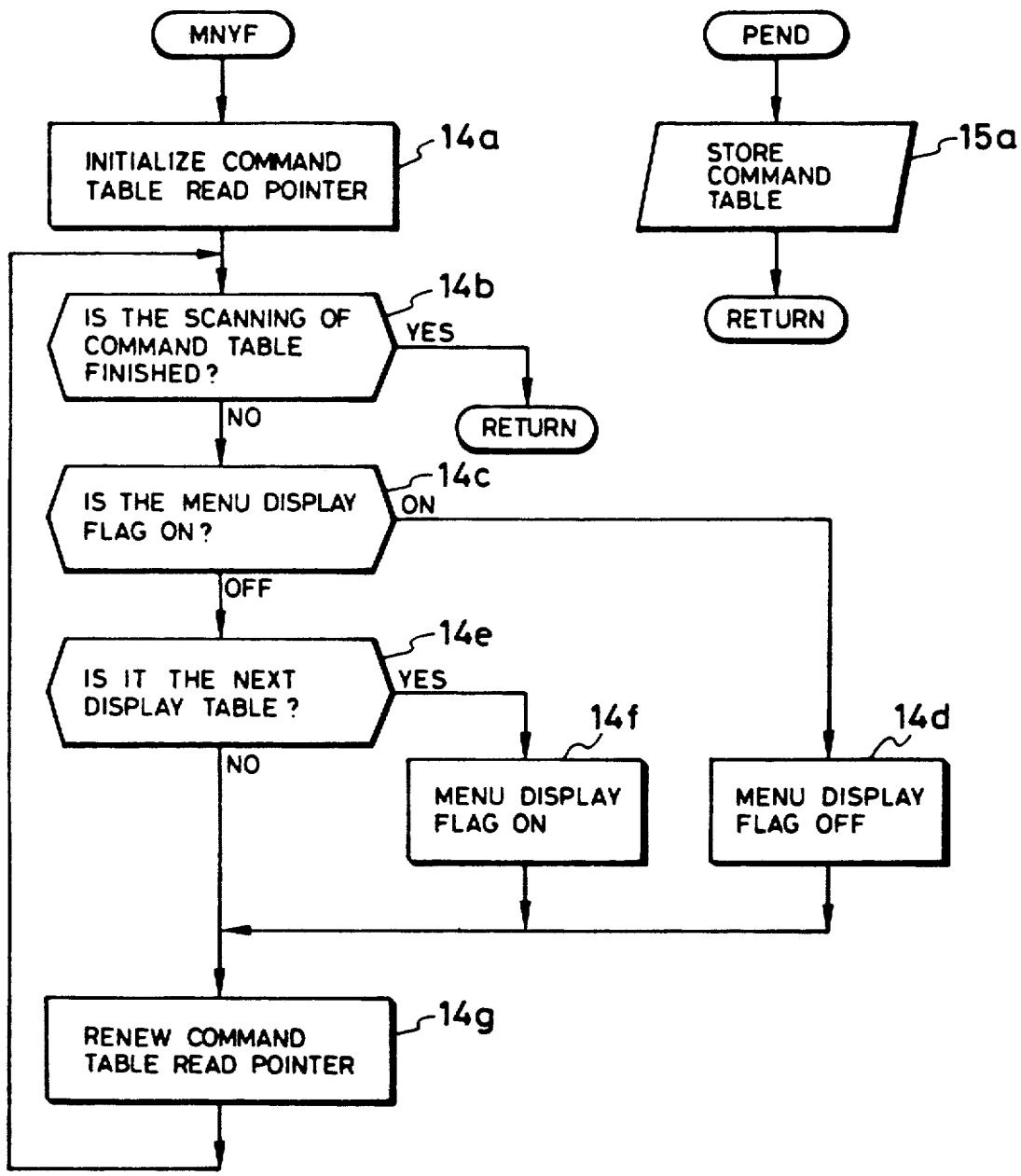

FIG. 16(a)

| | | DISPLAY PRIORITY ORDER | | |
| --- | --- | --- | --- | --- |
| | | 1 | 2 | 3 |
| FUNCTION KEYS | $F_n$ | $COM_p$ | $COM_q$ | $COM_r$ |

FIG. 16(b)

| $F_n$ | $COM_q$ | $COM_p$ | $COM_r$ |
| --- | --- | --- | --- |

FIG. 17

| | |
| --- | --- |
| | 3 |
| MENU DISPLAY POINTER | MDP |
| COMMAND TABLE READ POINTER | CRP |
| INPUT KEY DATA | KIN |
| EXECUTION PROCESSING DISPLAY PRIORITY ORDER | ESP |
| NEXT DISPLAY PRIORITY ORDER | NPM |

COMPUTER COMMAND INPUT UNIT GIVING PRIORITY TO FREQUENTLY SELECTED COMMANDS

This application is a continuation of application Ser. No. 07/093,478, filed Sep. 4, 1987, now abandoned.

BACKGROUND OF THE INVENTION

1. Field of the Invention

The present invention relates to a command input apparatus for computer equipment. More specifically, the invention relates to a command input apparatus which can be adapted to inputting commands provided in advance in an application program to be processed by the computer equipment.

2. Description of the Prior Art

Application programs to be executed by computer equipment, such as a program for preparing sentences, a program for preparing tables, or a program for data bases, have a variety of commands as well as functions for executing the commands. So far, the commands are inputted by a method by which command names assigned to each of the commands are inputted or by a menu selection method by which display data that represents the commands are displayed on a display screen so that the operator can select the desired command. In executing the above-mentioned application programs, in particular, the menu selection method is generally used. In relatively small computer equipment, such as those that are generally called personal computer, business computer and the like, the keyboard, which is an input device, is provided with four, eight or sixteen keys of the type called function keys.

In an application program developed for computer equipment of this type, in particular, commands are assigned to each of the function keys, and the operator depresses a function key that corresponds to his work to execute and designate a predetermined command.

In recent years, the application programs have been prepared in which a variety of functions are combined together; i.e., each application program has been prepared with increased functions to cope with a high degree of work. Therefore, the above-mentioned function keys are no capable of handling all the functions. Increasing in the number of function keys, however, causes the keyboard to become bulky and further presents a problem from the standpoint of operation. So far, therefore, a structure has been employed in which the menu is stratified. That is, a number of functions are grouped being stratified into similar functional units, and a predetermined function in each stratum is selected thereby to select the predetermined function. An example is shown in FIG. 18 which explains a functional structure in an application program that has a function of preparing documents. Here, symbols F1, F2, F3, -----, F16 denote function keys arranged on the keyboard, which can be depressed. In preparing a document, here, the operator may wish to execute the "erase" operation. For this purpose, the operator, first, depresses a function key F2 to select an edit function and then depresses a function key F14, thereby to execute the desired erase function. After the processing is finished by this function, he may then execute the "document registration" operation. For this purpose, the procedure is first returned to the main menu. A function key F5 is depressed and then a function key F10 is depressed to carry out the "document registration" operation.

Prior art of this sort has been disclosed in Japanese Patent Laid-Open Nos. 5320/1985, 180622/1984, 5323/1985 and in Japanese Utility Model Laid-Open No. 126333/1984.

According to the conventional art in which the menu is stratified, more functions can be selected with fewer function keys, presenting a great advantage. Depending upon the type of application program, however, the number of commands increases with the increase in the number of functions, eventually causing the number of strata to increase. This means that an increased number of selections are required to select desired functions, presenting a problem from the standpoint of operation.

Thus, the application program for providing higher functions inevitably requires an increased number of commands. This is to make the apparatus feasible for a wide range of businesses. In practice, however, the operator does not equally use all of the functions of the application program. That is, depending upon the business in which the operator takes part, only a limited number of commands are frequently used. In order to input a limited number of commands, therefore, the operator must carry out laborious work to select desired commands, which in turn impairs the operability.

SUMMARY OF THE INVENTION

The present invention was achieved in view of the above-mentioned points, and its object is to provide a command input apparatus with easy operation to select commands.

Another object of the present invention is to provide a command input apparatus which is capable of increasing the speed for inputting commands.

A further object of the present invention is to provide a command input apparatus which is capable of improving the operability.

The above-mentioned objects are achieved by dividing a number of commands into a plurality of groups depending upon their priority display order, successively displaying the commands within each group as a unit, and putting the selected commands into a group which has the highest priority order.

That is, the feature of the present invention resides in a command input apparatus which comprises:

a memory unit which stores execution instructions for each of a number of predetermined commands;

a memory table which stores data to divide the number of commands into groups according to a priority order;

a command display means which, in response to display instructions that are successively inputted, successively displays the commands within the group as a unit according to the priority order and based upon data stored in the memory table;

a command operation means which initiates operations of the selected command that is displayed; and a priority order renewal means which renews the memory table so that the executed commands are put into the group which has the highest priority order.

According to this structure, a number of commands are displayed by the command display means as a group based on the priority order. If a desired command is selected and operated at a moment when it is displayed, the command is executed and is put by the priority order renewal means into a group which has the highest priority order. Therefore, as a variety of commands are successively inputted, the commands which are selected and operated are successively put into the group having the highest priority order. When the next command is inputted, the command which the operator uses frequently is displayed at first. This makes it easy to select the command and to increase the input speed. Accordingly, a command input apparatus is obtained which features improved operability.

BRIEF DESCRIPTION OF THE DRAWINGS

FIG. 7(a-g) is a flow chart illustrating the details of a command menu display process;

FIG. 8 is a flow chart illustrating the details of a key input process;

FIG. 12(a-c) is a flow chart illustrating the details of a display menu renewal process;

FIG. 13(a-d) is a flow chart illustrating the details of a next display priority order calculation process;

FIG. 14(a-d) is a flow chart illustrating the details of a menu display flag renewal process;

FIG. 15a is a flow chart illustrating the details of a program finish process;

FIG. 16(a) and (b) is a diagram illustrating the renewal of the display priority order;

FIG. 17 is a diagram of a memory structure illustrating a variety of temporary storage units.

DESCRIPTION OF THE PREFERRED EMBODIMENTS

Figure 2:
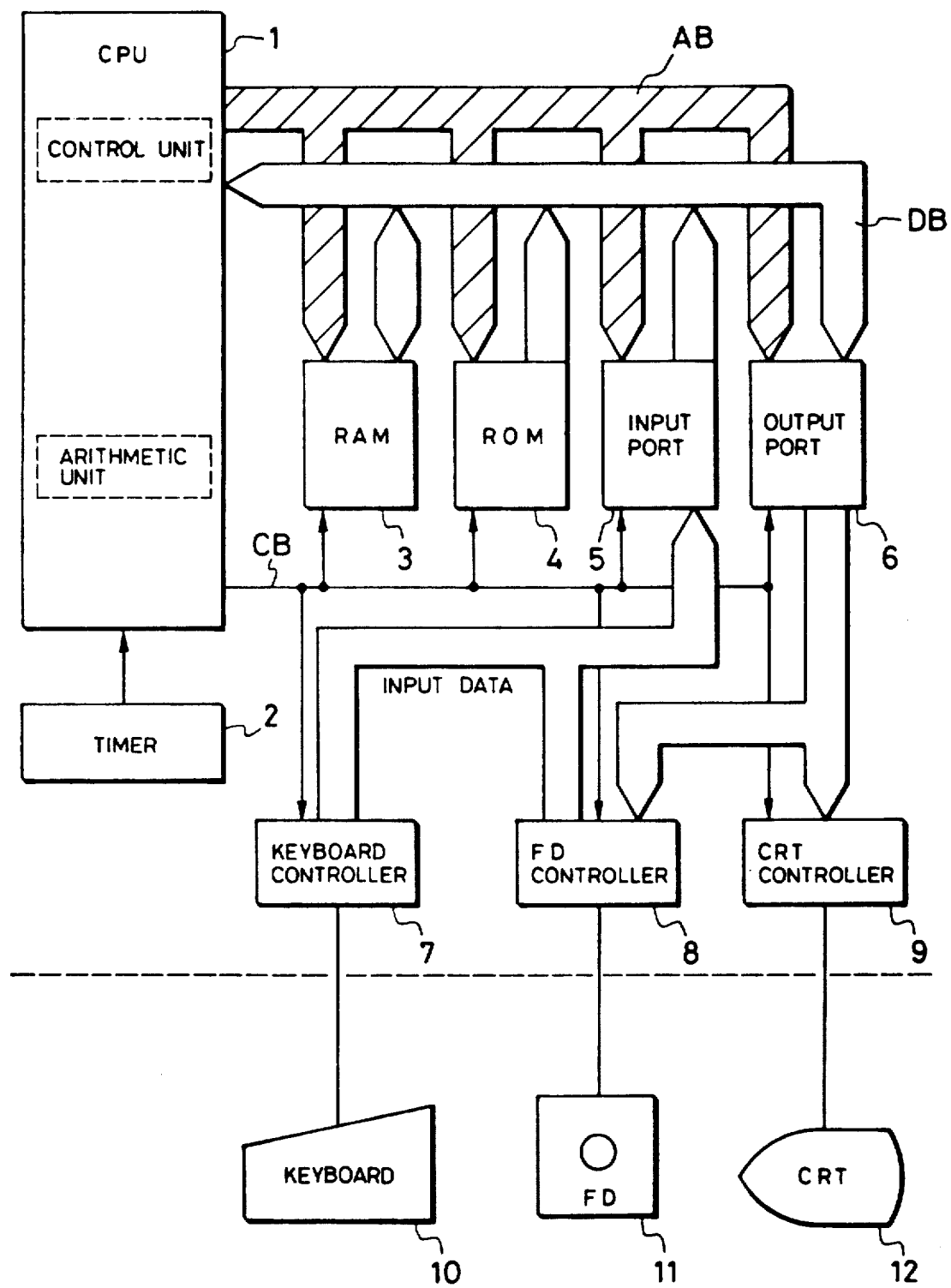
FIG. 2 is a block diagram illustrating the structure of computer equipment to which the present invention is adapted.

An embodiment of the invention will now be described in conjunction with the drawings. FIG. 2 is a block diagram illustrating the general structure of a relatively small computer device of the type which is generally called a personal computer or a business computer to which the present invention is adapted. In FIG. 2, reference numeral 1 denotes a central processing unit (hereinafter referred to as CPU), 2 denotes a timer which sends an operation timing signal to the CPU 1, 3 denotes a readable/writable memory (hereinafter referred to as RAM) which chiefly stores data or a program read from an auxiliary memory, 4 denotes a read-only memory (hereinafter referred to as ROM) which stores fixed data or a program, 5 denotes an input port for reading data from an external unit, 6 denotes an output port for producing data to an external unit, reference numerals 10, 11 and 12 denote external units, wherein 10 denotes a keyboard which is an input unit, 11 denotes a floppy disc memory (hereinafter referred to as FD) which is an auxiliary memory, and 12 denotes a display device which serves as an output device and which in this embodiment is a Braun tube display device (hereinafter referred to as CRT).

Reference numeral 7 denotes a keyboard controller which controls the keyboard 10 and which transmits the data received thereby to the input port 5, reference numeral 8 denotes an FD controller which transmits data between the FD 10 and the CPU 1, and reference numeral 9 denotes a CRT controller which controls the CRT 12 so that the image data from the CPU 1 are displayed on the CRT 12. The above-mentioned units are connected to the CPU 1 through an address bus AB, a data bus DB and a control bus CB maintaining predetermined relations, thereby to constitute the computer device as a whole.

Figures 3, 4:
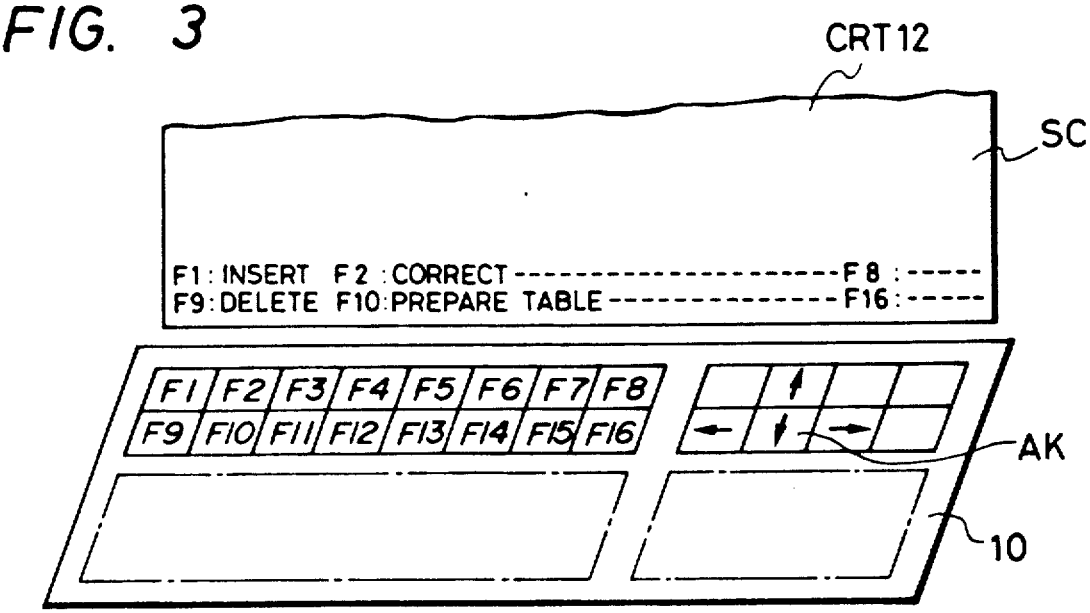
FIG. 3 is a diagram illustrating a relationship between a CRT and a keyboard.
FIG. 4 is a diagram showing a relationship between the function keys and the display priority order of the commands.

The application program is generally stored in the FD 11. To execute the application program, the whole of it or a major portion of it is transferred to the RAM 3 and is then executed by the CPU 1 to achieve a predetermined function. When the application program is started according to this embodiment, command designations corresponding to function keys F1, F2, F3, -----, F16 arranged on the keyboard 10 are displayed on the lower reserved command display lines on the display screen SC of CRT 12 as shown in FIG. 3.

Figure 1:
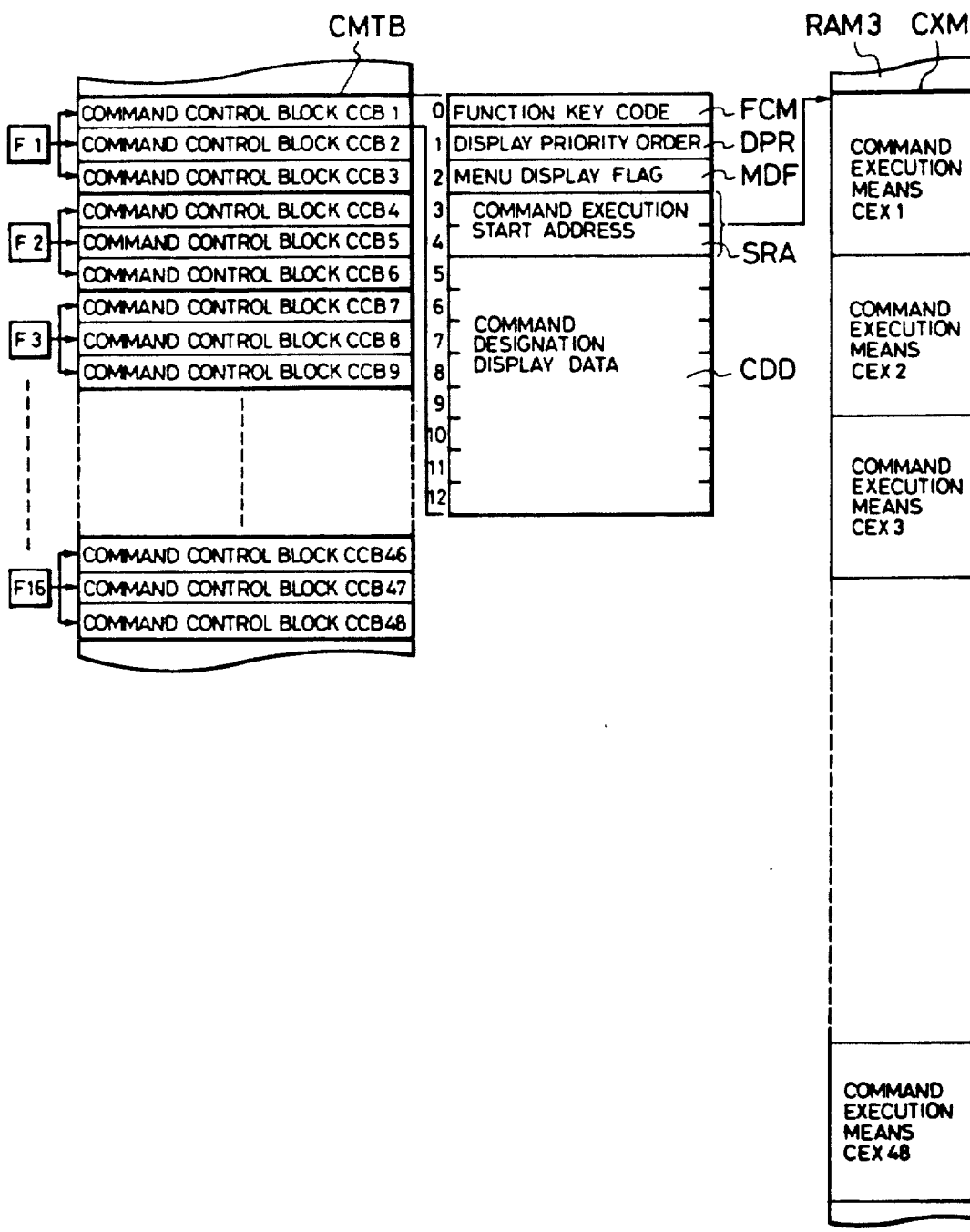
FIG. 1 is a diagram of a memory which illustrates a relationship among the function keys, a command table and command execution means according to an embodiment of the present invention.

For example, "F1: Insert", "F2: Correct", -----, "F16: -----" can be displayed. In executing a number of preset commands, the application program stored in the RAM 3 is the one which stores in the RAM 3 a number of command execution means in the form of a program to execute the individual commands. FIG. 1 is a diagram of a memory structure showing relationships between the command execution means CEX1, CEX2, CEX3, ----- (CEX'x subsequent to CEX48 are often referred to generally as CEXn) arranged and stored in a memory unit CXM set to the RAM 3 and the function keys F1, F2, F3, -----, F16 (hereinafter often referred to generally as Fn). Further, the command execution means CEX1, CEX2, CEX3, -----, CEX48 arranged and stored in the RAM 3 and the function keys F1, F2, -----, F16 correspond with a command table CMTB that is arranged and stored in the RAM 3. The command table CMTB is equipped with command control blocks CCB1, CCB2, CCB3, -----, CCB48 (hereinafter often referred to generally as CCBn) of a number that corresponds to the number of commands.

In this embodiment, three commands correspond to a single function key and, hence, there are 48 commands.

The command control blocks CCB1, CCB2, CCB3, -----, CCB48 have the same structure and are provided with various memory units. Symbol FCM denotes a function key code memory which stores key codes of the function keys F1, F2, F3, -----, F16 that correspond to the command control blocks CCB1, CCB2, CCB3, -----, CCB48.

In this case, the key code of the function key F1 is stored in the memory FCM of the command control blocks CCB1, CCB2 and CCB3, and the key code of the function key F2 is stored in the memory FCM of the command control blocks CCB4, CCB5 and CCB6. Likewise, the key code of the function key F16 is stored in the memory FCM of the command control blocks CCB46, CCB47 and CCB48. Symbol DPR denotes a display priority order memory for storing order data which determines the order for displaying a plurality of commands allocated to the function keys. Symbol MDF denotes a menu display flag memory which stores whether the command designation display of a command corresponding to the present command control block CCBn is to be displayed on the display screen SC of the CRT 12. Symbol SRA denotes a command execution start address memory which stores the command control block CCBn and a head address of a command execution means CEXn for the corresponding command. Symbol CDD denotes a command designation display data memory which stores the command designation display data of a command corresponding to the command control block CCBn. This data is the one such as "Insert", "Correct", ----- or the like that is to be displayed on the display screen SC shown in FIG. 2. As described above, each command control block CCBn is provided with a variety of memories FCM, DPR, MDF, SRA, CDD, so that the function key Fn and the command execution means CEXn correspond to each other.

FIG. 4 is a diagram illustrating a relationship of display priority order of commands COM1, COM2, COM3, -----, COM48 for the function keys F1, F2, F3, -----, F16. In this embodiment as will be described later, the commands having the display priority order "1" are displayed on the display screen SC for the function keys F1, F2, F3, -----, F16. Next, by inputting a display change instruction, those commands having the display priority order "2" are displayed on the display screen SC. By inputting a display change instruction, furthermore, those commands having the display priority order "3" are displayed on the display screen SC.

Figure 5:
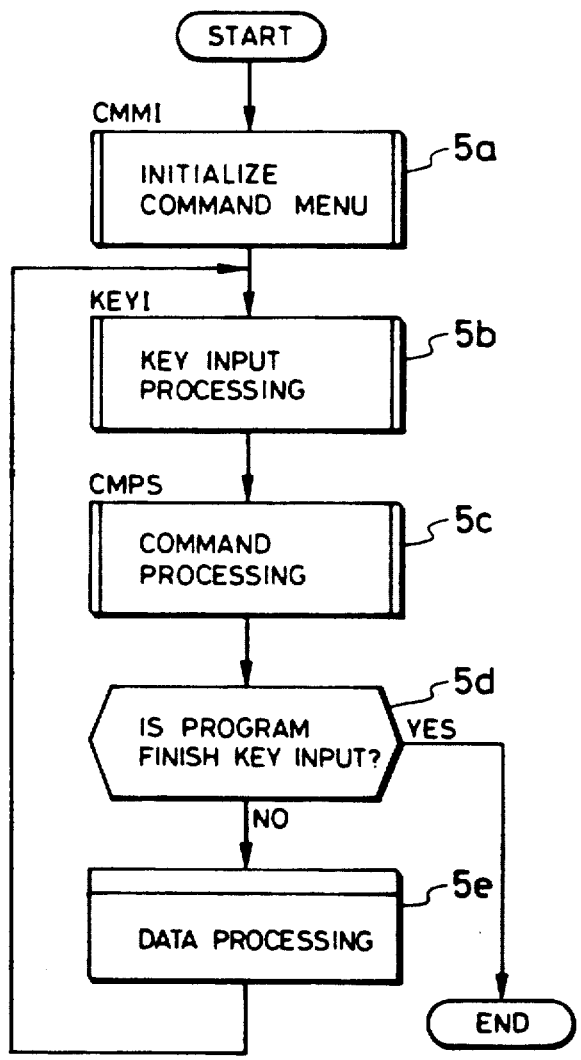
FIG. 5 is a flow chart illustrating the flow of the whole processing of an application program in which the present invention is applied.

FIG. 5 is a flow chart which illustrates the processing of an application program employing a command input apparatus according to the present invention. When started, the application program first executes a command menu initialization process CMMI at a step 5a. That is, as will be described later in detail, predetermined data is read from the FD 11, which is an external memory, and is stored in the command table CMTB, and a command designation display which indicates a predetermined command is displayed on the display screen SC of CRT 12.

A next step 5b executes the key input process process KEYI. In this step, the key data input by the operator through the keyboard KB is read, as will be described later in detail. A step 5c executes the command process process CMPS which plays an important role in this embodiment. As will be described later in detail, the command is executed, the display priority order is renewed, and the command is displayed based upon the key data input at the step 5b. A step 5d determines whether the key data input at the step 5b designates the end of the application program or not. If the key data is not the one which designates the completion of the application program, then the step 5e executes the data processing assigned in compliance with the application program that corresponds to the key data. When the processing is finished, the program is returned to the step 5b. Thereafter, the processing of the steps 5b, 5c, 5d and 5e is performed repetitively until the key is depressed by the operator to designate the completion of the application program. Execution of the program is ended when the finish key is depressed.

The flow chart of various processes CMMI, KEYI and CAMS shown in FIG. 5 will now be describe in detail. In the drawing, numerals surrounded by a circle indicate that they are coupled to circle within the same drawing figure surrounding the same numeral. In executing the processing means, furthermore, a variety of temporary memories are used, being set to predetermined addresses of the RAM 3. FIG. 17 illustrates these temporary memories where MDP denotes a menu display pointer memory for indicating a position on the display screen SC to display a menu of various commands, CRP denotes a command table read pointer memory for designating the successive scanning of the command table CMTB to read the contents thereof, and KIN denotes an input data memory which temporarily stores the key data that corresponds to a key input through the keyboard 10. Symbol NPM denotes a next display priority order memory which stores the priority order of commands to be displayed next.

Figure 6:
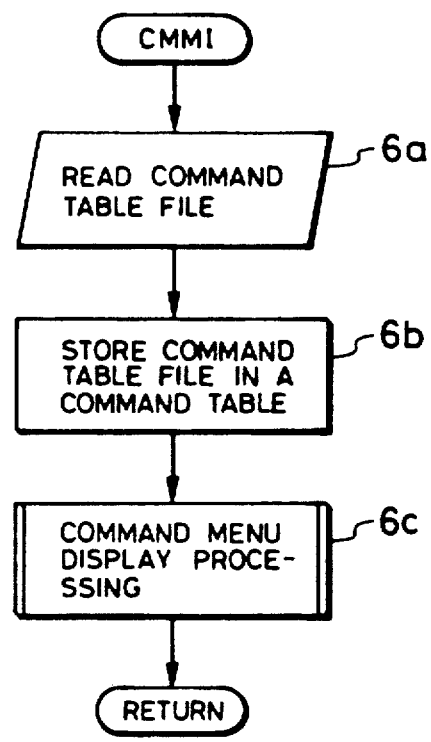
FIG. 6 is a flow chart illustrating the details of a command menu initialization means.

FIG. 6 is a flow chart which illustrates the command menu initialization process CMMI shown in the step 5a of FIG. 5. When started, this means reads the command table file at a step 6a. As will be described later, the content stored in the command table CMTB is finally stored as a command file in the FD 11 which is an external memory. Therefore, this step 6a reads the previously stored in the FD 11.

Then, a step 6b stores the thus read command file in a predetermined position of the command table CMTB. Therefore, a command execution means CEXn identified in advance is correlated to a function key Fn. Predetermined suitable data is written at an initial moment onto the display priority order memory DPR and onto the menu display flag memory MDF in each of the command control blocks CCBn stored in the command table CMTB. In this embodiment at this moment as shown in FIG. 4, the priority order data "1" is written onto the display priority order memory DPR of command control blocks CCB1, CCB4, CCB7, CCB10, -----, CCB46, the priority order data "2" is written onto the display priority order memory DPR of command control blocks CCB2, CCB5, CCB11, -----, CCB47, and the priority order data "3" is written onto the display priority order memory DPR of command control blocks CCB3, CCB6, CCB9, CCB12, -----, CCB48. Further, the menu display flag memories MDF of the command control blocks CCB1, CCB4, CCB7, CCB10, -----, CCB46 are ON, and other memories are OFF. After the step 6b, a step 6c executes the command menu display processing means CMND.

FIG. 7 is a flow chart which illustrates in detail the command menu display process means CMND executed by the step 6c of FIG. 6. When started, this process CMND first initializes the menu display pointer MDP at a step 7a. That is, the step 7a so initializes the pointer MDP that it indicates a head position of the command display line on the display screen SC. Then, a step 7b initializes the command table read pointer CRP. That is, the step 7b so initializes the pointer CRP that it indicates the head position of the command table CMTB. A step 7c reads the content of the menu display flag memory MDF of a command control block CCBn indicated by the pointer CRP, and determines whether it is ON or OFF. The menu display flag memory MDF is read by reading the content of an address which comes in advance by two addresses of the address indicated by the pointer CRP. When the content is determined to be ON, the content of a command designation display data memory CDD of a command control block CCBn selected by the pointer CRP is read; i.e., the data are read from 5 addresses to 12 addresses in advance of the address indicated by the pointer MDP, and are displayed as menu data at a position indicated by the menu display pointer MDP. A step 7e renews the pointer MDP. In this embodiment, one menu data is displayed by eight characters on the display screen SC of the CRT 12. Therefore, the step 7e renews the pointer MDP by 8 characters so that a next display position is indicated. The program then proceeds to a step 7f. If step 7c determines that the menu display flag MDF is OFF, then the process is immediately transferred to step 7f which renews the command table read pointer CRP by 13 addresses. Therefore, the pointer CRP indicates the head address of the next command control block CCB(n+1). As will be obvious from FIG. 1, the command control block CCBn in this embodiment consists of 13 bytes. Next, a step 7g determines whether the pointer CRP has scanned the whole command table CMTB. If the command table CMTB is all scanned, the process CMND is finished. When the scanning is not finished, the process returns to the step 7c; i.e., a series of processings are repeated starting from the step 7c. According to this embodiment, whether the command table CMTB is all scanned or not is determined by writing, for example, a data "00" after the command table CMTB. As described above, among the command control blocks CCB1, CCB2, CCB3, -----, CCB48, the menus corresponding to those in which the menu display flag MFD is ON are successively displayed on the command display line of the CRT 12. That is, at this moment, the menus corresponding to commands COM1, COM4, COM7, COM10, -----, COM46 of FIG. 4 are displayed. When the command menu display process CMND is finished, the operation returns to the command menu initialization process CMMI of FIG. 6, and process CMMI is finished.

FIG. 8 is a flow chart which illustrates the key input process KEYI shown in step 5b of FIG. 5. When started, the key input process KEYI waits for the key input from the keyboard 10 at a step 8a. When the key is depressed, a next step 8b reads the key data that corresponds to the key, and the key data is stored in the input key data memory KIN to finish the processing.

Figure 9:
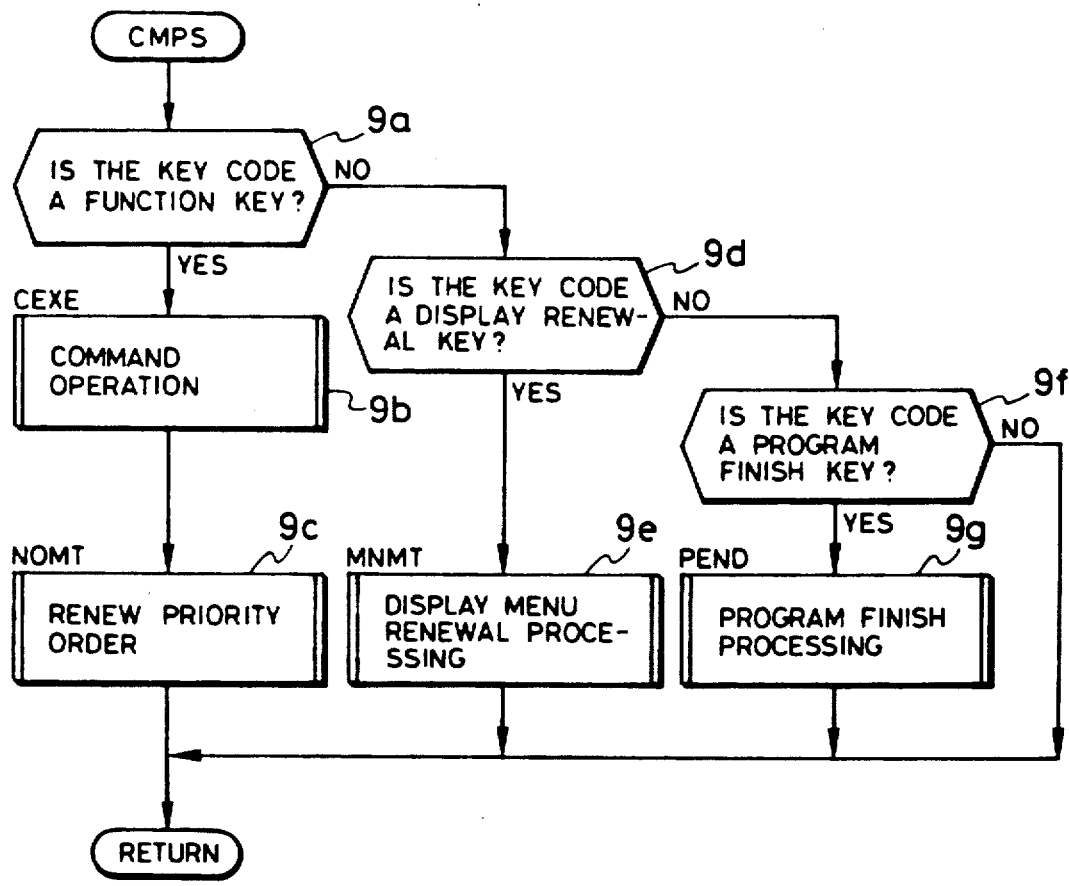
FIG. 9 is a flow chart illustrating the details of a command process.

FIG. 9 is a flow chart that illustrates the command process CMPS shown in the step 5c of FIG. 5. When started, this process CMPS, first, examines the content of input data memory KIN at a step 9a to determine whether it is that of the function key F1, F2, F3, -----, or F16. If it is that of the function key F1, F2, F3, -----, or FIG. 16, the process is transferred to the corresponding command operation CEXE shown in a step 9b. After the execution of the command operation CEXE, the process is transferred to the priority order renewal process NOMT Of a command table CMTB, as shown by step 9c. Details of these processes CEXE, NOMT will be described later.

If the key data input at the step 9a is not that of the function key F1, F2, F3, -----, or F16, the process is transferred to the step 9d where it is determined whether the key data is that of a display change instruction key which renews the menu, i.e., which changes the menu display that is now displayed on the display screen SC. The display change instruction is assigned in advance to given keys arranged on the keyboard KB, such as arrow keys AK shown in FIG. 3. As a result of this step, if the key data is to renew the menu, the process is transferred to the display menu renewal process MNMT shown in a step 9e. Details of this process MNMT will be described later. When the determination in step 9d is negative, the process is transferred to a step 9f where it is determined whether the key input is to finish the program or not. When the key is to finish the program, the process is transferred to the program finish process PEND shown by a step 9g. Details of this process PEND will be described later. When the determination in step 9f is negative, process CMPS is finished without performing any program finish processing.

Figure 10:
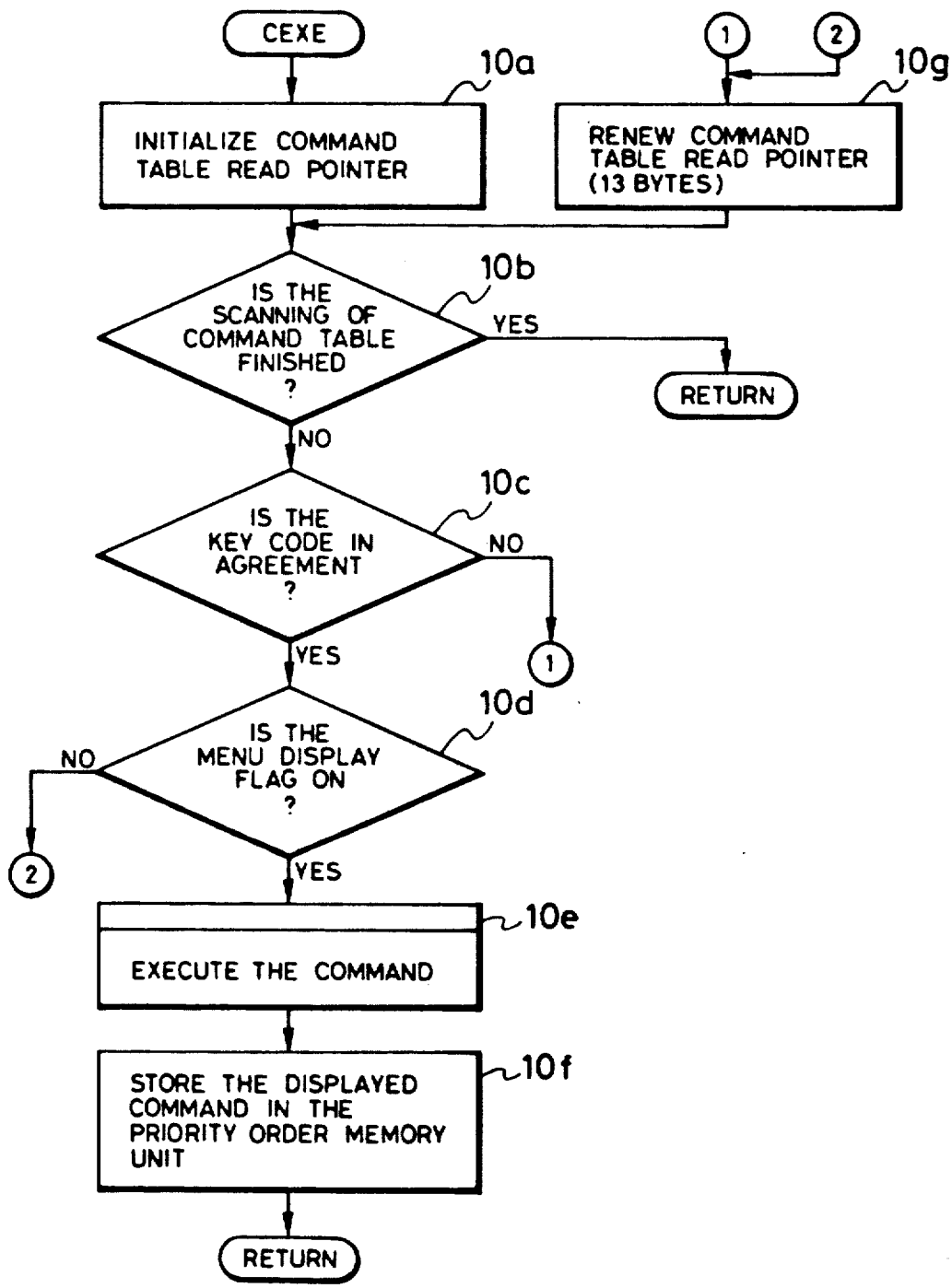
FIG. 10(a-g) is a flow chart illustrating the details of a command operation.

FIG. 10 is a flow chart which illustrates in detail the command operation means CEXE executed by the step 9b of FIG. 9. When a function key Fn is depressed as will be obvious from FIG. 9, the command operation means CEXE executes a command that corresponds to the function key Fn and that is displayed. That is, if concretely mentioned, a command control block CCBn which extinguishes the next condition is found, and the process is transferred to a command execution means CEXEn which corresponds to the command control block CCBn. In this embodiment, the abovementioned condition stands for a command control block CCBn in which the depressed function key Fn is in agreement with the content of the function key code memory FCM and the menu display flag MDF is ON. This condition will now be described in detail with reference to FIG. 10. First, when started, the command operation process CEXE initializes the command table read pointer CRP at a step 10a. That is, the head address of the command table CMTB is set to the pointer CRP. A next step 10b determines whether the pointer CRP has scanned the whole command table CMTB. This discrimination is effected under the same criterion as that of the step 7g of FIG. 7. When this condition is satisfied, the command operation process CEXE is finished. When the condition is not satisfied, a step 10c determines whether the content of a function key code memory FCM indicated by the pointer CRP is in agreement with the content stored in the input key data memory KIN at the step 8b of FIG. 8. When they are in agreement with each other, a next step 10d determines whether the menu display flag MDF of the command control block CCBn is ON or not. When the menu display flag MDF is ON, it means that the above-mentioned condition is satisfied and a corresponding command execution process CEXEn is started in the next step 10e. That is, a command execution start address is read out from a memory SRA of the command control block CCBn, and the control operation is transferred from this address to the command execution means CEXn that is stored. This step 10e executes a predetermined command intended by the operator. When the execution is finished, the content of a display priority order memory DPR of the command control block CCBn is stored in the execution process select priority order memory ESP at a step 10f. This is used for the renewal of the display priority order that will be described later. The process CEXE is thus finished. When the condition is not satisfied at the step 10c or 10d, the process is transferred to a step 10g which renews the command table read pointer CRP by 13 addresses, i.e., which so renews the pointer CRP that it indicates the head address of the next command control block CCBn. After the process of step 10g is finished, the process is returned to step 10b where the command control blocks CCBn are scanned until the conditions of steps 10c and 10d are both satisfied, thereby to detect a command that is to be executed.

Figure 11:
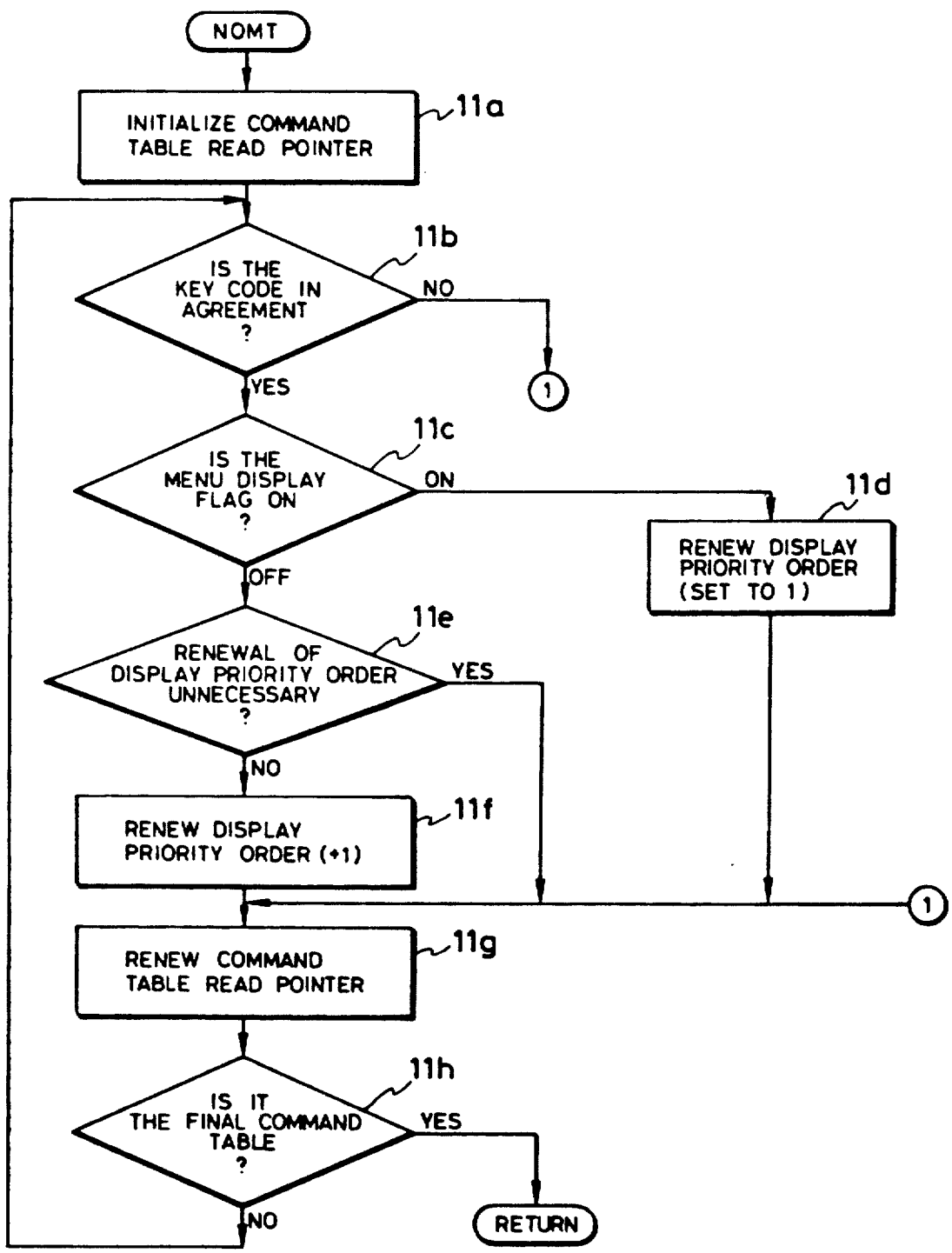
FIG. 11(a-h) is a flow chart illustrating the details of a display priority order renewal process.
Figure 18:
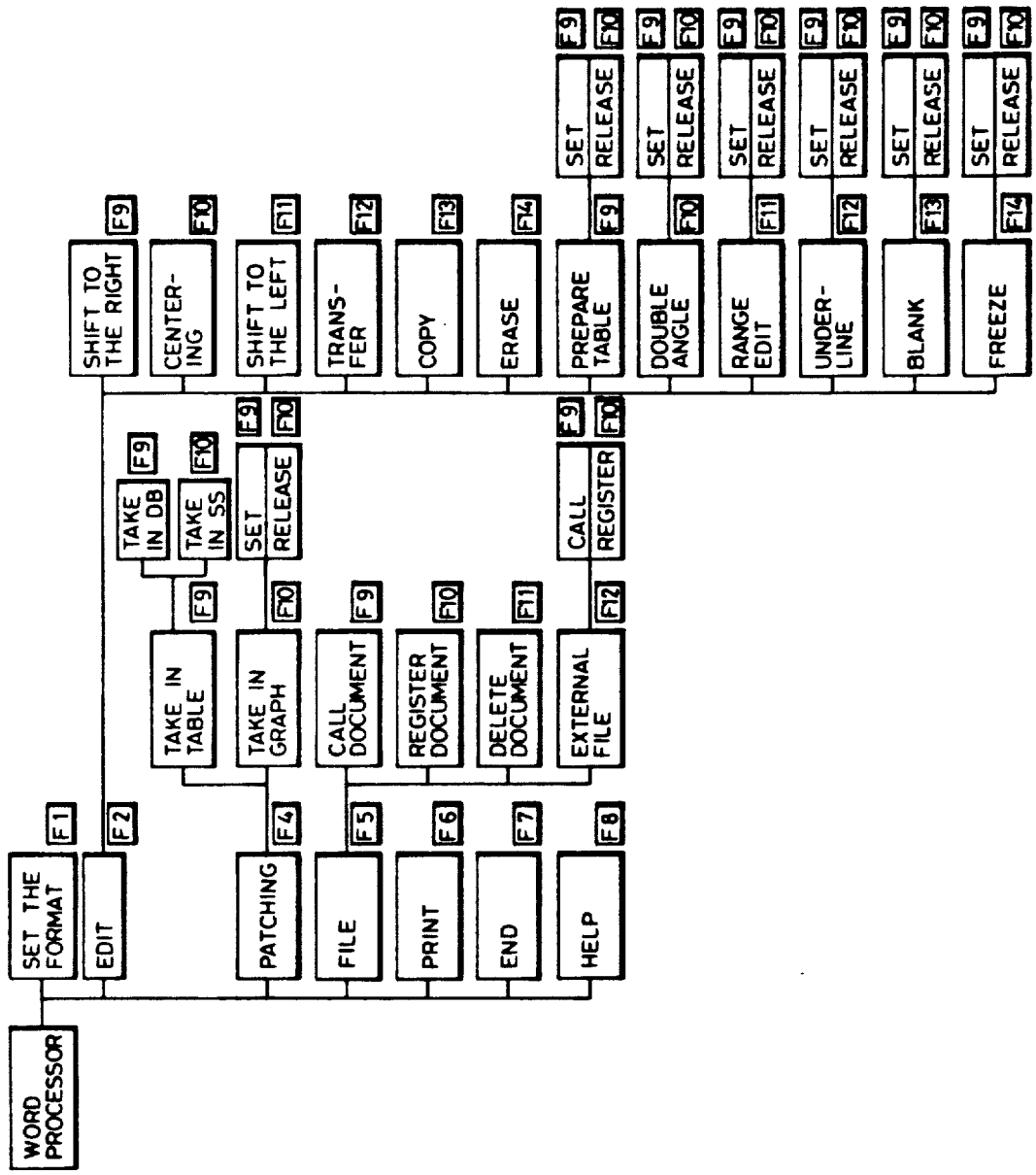
FIG. 18 is a diagram illustrating a conventional menu strata structure.

FIG. 11 is a flow chart which illustrates in detail the priority order renewal process NOMT executed by step 9c of FIG. 9. When a predetermined command processing is executed as will be obvious from FIG. 9, the priority order renewal means NOMT puts the command to the highest order in the corresponding function key Fn at the time of displaying the menu in the next time. Concretely speaking, the priority order renewal process NOMT renews the content of the display priority order memory DPR of the three command control blocks CCBn that correspond to the function key Fn. In a step 11a, first, the command table read pointer CRP is initialized like in the step 10a of FIG. 10. Next, a step 11b determines whether the content of the function key code memory FCM indicated by the pointer CRP is in agreement with the content stored in the input key data memory KIN at the step 8b of FIG. 8. When they are in agreement with each other, a step 11c determines whether the menu display flag MDF of the command control block CCBn is ON or not. Here, the condition is satisfied stands for the command control block CCBn executed in FIG. 10. In this case, the process is transferred to a step 11d where the content of the display priority order memory DPR of the command control block CCBn is set to the priority order "1".

In the next menu time, therefore, the command which corresponds to the command control block CCBn is displayed at first. In the step 11c, the menu display flag MDF which is OFF stands for a command control block CCBn that corresponds to two other commands that correspond to the same function key Fn but that are not selected, as will be obvious with reference to the step 11b. In a step 11e or 11f, therefore, the content of the display priority order memory DPR is renewed to the priority order "2" or "3". For this purpose, the step 11e determines whether the priority order needs be renewed or not. That is, the content stored in the execution process select priority order memory ESP in the step 10f of FIG. 10 is compared with the content of the display priority order memory DPR of the command control block CCBn that is now scanned by the pointer CRP. Here, the order needs not be renewed if the priority order of the memory DPR is lower than the priority order of the memory ESP. If this condition is not satisfied, the order must be renewed, and the process is transferred to the step 11f where 1 is added to the content of the display priority order memory DPR of the command control block CCBn that is now being scanned, i.e., the priority order is lowered by 1 to renew the priority order. The process is then transferred to a step 11g. When the condition is satisfied in the step 11e, or when the process of step 11d is finished and when the contents are not in agreement in step 11b, the process is directly transferred to step 11g. Steps 11g and 11h resemble the steps 10g and 10b of FIG. 10. Namely, the step 11g renews the pointer CRP to indicate the next command control block CCBn, and the step 11h determines whether the command table CMTB is all scanned or not. When the command table CMTB is all scanned, the priority order renewal process NOMT is finished. When the command table CMTB is not all scanned, the process is returned to step 11b to repeat the above-mentioned processings. The above-mentioned process will now be concretely described. That is, with reference to FIG. 16 which corresponds to FIG. 4, it is now presumed that the commands COMp, COMq and COMr are assigned to the function keys Fn in the order of priority as shown in FIG. 16(a), and that the command COMq is executed in FIG. 10. Then, the priority order renewal process NOMT renews the priority order so that the command OCMq has the priority order "1", the command COMp has the priority order "2" and the command COMr has the priority order "3" as shown in FIG. 16(b).

FIG. 12 is a flow chart which illustrates in detail the display menu renewal process MNMT executed in the step 9e of FIG. 9. As will be obvious from FIG. 9, this process is started by manipulating the menu display renewal key of the keyboard 10, and has a function to display the ordered menus on the display screen SC. First, a step 12a initiates a next display priority order calculation process NEXD which calculates the priority order that is to be displayed next, as will be described later in detail. Then, based upon the thus calculated priority order, a step 12b drives a menu display flag renewal process MNYF which renews the menu display flag MDF of the command control block CCB that corresponds to a command which is to be displayed next. Then, the control operation is transferred to the command menu display process of FIG. 7 to display the next menu.

Processes NEXD and MNYF shown in FIG. 12 will now be described in detail. FIG. 13 is a flow chart which illustrates in detail the next display priority order calculation means NEXD executed in a step 12a of FIG. 12. The next display priority order calculation process NEXD finds a command control block CCBn which corresponds to a command that is now being displayed, reads the presently displayed display priority order from the block CCBn, and calculates the display priority order of a command that is to be displayed next. When started, the next display priority order calculation process NEXD initializes the command table read pointer CRP in the step 13a. Like the step 10a of FIG. 10, this is to set a head address of the command table CMTB to the pointer CRP. Then, a step 13b determines which menu display flag MDF of the command control block CCBn is indicated by the pointer CRP. Here, if the menu display flag MDF is ON, it means that the command control block CCBn is now being displayed. If the menu display flag MDF is OFF, a step 13c renews the pointer CRP like the step 10g of FIG. 10 to indicate the next command control block CCBn, and the process is returned to the step 13b. If the menu display flag MDF is ON in the step 13b, a step 13d calculates a next display priority order.

This is done by reading the content of the display priority order memory DPR of the command control block CCBn indicated by the pointer CRP, and adding "1" thereto. For instance, if the command now being displayed has the display priority order "1", the command to be displayed next by the input of the menu display renewal key has the display priority order "2", and the command to be displayed next has the display priority order "3". The step 13d calculates the next display priority order. If now the command that is now being displayed has a display priority order "3", then it is so programed that the next display priority order will be "1", so that the commands can be displayed cyclically. The next display priority order which is calculated is stored in the next display priority order memory NPM, and the next display priority order calculation process NEXD is finished.

FIG. 14 is a flow chart which illustrates in detail the menu display flag renewal process MNYF executed in step 12b of FIG. 12. Based upon the next display calculation priority order calculated and stored in step 13d of FIG. 13, the menu display flag renewal process MNYF turns on the menu display flag MDF of the command control block CCBn whose order is in agreement therewith. For this purpose, a step 14a sets the command table read pointer CRP to a head address of the command table CMTB, and a step 14b determines whether the pointer CRP has scanned the whole command table CMTB. A step 14g renews the pointer CRP to scan all of the command control blocks CCBn of the command table CMTB. The steps 14a, 14b and 14g correspond to the steps 10a, 10b and 10g of FIG. 10. Owing to these steps 14a, 14b and 14g, the processes of the steps 14c, 14d, 14e and 14f are executed for the command control blocks CCBn. The step 14c determines whether the menu display flag MDF of the command control block CCBn indicated by the pointer CRP is ON or OFF. When the menu display flag MDF is ON, it means that the command control block CCBn corresponds to a command that is now being displayed, and the step 14d turns the menu display flag MDF OFF so that it will not be displayed in the next time. The menu display flag which is OFF presents the probability that it may be displayed in the next time. The step 14e compares the content of the display priority order memory DPM of the command control block CCBn with the content of the next priority order memory NPM. When they are in agreement with each other, it is the command control block CCBn which corresponds to a command that is to be displayed next, and the step 14f turns the menu display flag ON. When they are not in agreement, the menu display flag MDF remains OFF, and the process is transferred to the step 14g. After the steps 14d and 14f are finished, furthermore, the process is transferred to the step 14g. Owing to the input of the menu display change key as described above, the menu display flags MDF of the command control blocks CCBn that correspond to the command to be displayed next, are all turned ON. After the menu display flag renewal process MNYF is finished, the process is transferred to the command menu display process CMND as will be obvious from FIG. 12. As is obvious from FIG. 7, the command menu display process CMND displays on the display screen SC a command that corresponds to a command control block CCBn whose menu display flag MDF is ON. Therefore, the menu display flag renewal process MNYF displays the command that corresponds to the command control block CCBn whose menu display flag MDF is turned ON. That is, the menu is renewed and is displayed.

FIG. 15 is a flow chart which illustrates the finish process PEND executed in the step 9g of FIG. 9. The finish process PEND is started in response to the program finish key input by the operator through the keyboard 10, and reads the content of the command table CMTB at a step 15a and stores it as a command file in the FD 11 to finish the processing.

When the application program is started, the commands for the application program having the display priority order "1" are first displayed by the command menu display process CMND. When a desired command is not displayed, the operator depresses the menu display renewal key AK. Then, the commands of the next order are displayed on the display screen SC by the display menu renewal process MNMT. When a desired command is displayed, a corresponding function key Fn is depressed. This initiates the command operation process CEXE so that the desired command is executed. Then, the selected command is ranked at the highest order by the priority order renewal process NOMT.

When the commands are successively selected in operating the application program, the commands which are selected as described above are successively ranked to the highest order. Then, a command selected in the past is displayed at first for the next command input. At this moment, a desired command is immediately displayed and is selected at a greater probability. Therefore, the command can be easily selected, contributing to increasing the input speed thereof and improving the operability.

The above embodiment has dealt with the case where three commands are corresponded to one function key Fn. There is, however, no limitation in the number of the commands provided they exist in a plural number. Further, though the above description has dealt with the case where there were employed 16 function keys, there exists no particular limitation in the number of the function keys provided they exist in a plural number. The above embodiment has dealt with the case where the commands were selected and operated by the function keys Fn. The functions, however, may be assigned to other keys such as numeral input keys; i.e., there is no limitation in the types of keys. Moreover, the commands need not be selected by these keys, but may be selected by a coordinate designation unit which designates the coordinate position on the display screen SC on which the commands are displayed.

In this embodiment, furthermore, the arrow keys AK on the keyboard 10 were used as the display change instruction input means for the commands having a next display order. Here, however, use can be made of other keys and use can further be made of a coordinate designation unit or the like which designates a coordinate position on the display screen SC as described above.

Moreover, the embodiment has dealt with the case where the individual command control blocks CCBBn of the command table CMTB are provided with the display priority order memory DPR and the menu display flag MDF. The command control blocks CCBn, however, may be provided with the display priority order memory DPR only. That is, the priority order that is now displayed by the command display process CMND is stored, and the command to be displayed next is retrieved and displayed by the input of the menu display renewal key AK relying upon the above stored priority order.

What is claimed is:

1. A command input apparatus comprising:
 a first memory device for storing processing instructions for each of a plurality of predetermined commands in a plurality of predesignated groups of identical size, each group including a like plurality of commands;
 command display means for displaying designations of each of the commands within one of the groups in response to display instructions applied thereto;
 a plurality of command designation input means, one command designation input means corresponding to each of the displayed commands;
 command operation means for initiating execution of a processing instruction in response to selection and actuation of the corresponding command designation input means;
 a second memory device for storing an association table associating the plurality of commands with said plurality of command designation input means and for storing data indicative of a priority display order for said plurality of command input designation means; and priority order renewal means for updating said second memory device such that the command corresponding with an actuated one of said plurality of command designation input means is within the one of the groups whose designations are displayed on said command display means;

said command operation means initiating execution of a particular processing instruction based upon said association table.

2. A command input apparatus comprising:

a first memory device for storing processing instructions for each of a plurality of predetermined commands in a plurality of predetermined groups of identical size, each group including a like plurality of commands;

command display means for displaying designations of each of the commands within one of the groups in response to display instructions applied thereto;

a plurality of command designation input means, one command designation input means corresponding to each of the displayed commands;

command operation means for initiating execution of a processing instruction in response to selection and actuation of the command designation input means corresponding to the command of the initiated processing instruction while that corresponding command is displayed on said command display means;

a command table associating the plurality of commands with said plurality of command designation input means and storing data indicative of a priority display order for said plurality of command designation input means;

said command display means including means for reading from said command table data indicative of the priority display order for each of said plurality of command designation input means, means for normally displaying as a group on the command display means commands having a first priority display order, and means responsive to the display instructions for displaying on the display means commands having a second priority display order; and priority order renewal means for updating the priority display order data in response to designation of a displayed command by said command designation input means.

3. A command input apparatus for a computer, comprising:

a memory table for storing commands in a plurality of predesignated groups of identical size, each group including a like plurality of commands;

command display means for displaying designations of each of the commands within one of the groups, said command display means normally displaying the designations of a first predetermined one of the groups and responsive to a first command selection signal to display a different predetermined one of the groups;

first command selection means manually actuable by an operator for generating a first command selection signal to select one of said groups of commands to have the designations thereof displayed on said command display means;

second command selection means manually actuable by the operator for generating a second command selection signal to select one command from the displayed group for operation;

command operation means responsive to the second command selection signal for initiating operation of the selected command; and priority order renewal means responsive to the second command selection signal during display of the designations of a group of commands other than the first predetermined one of the groups for transferring the selected command to the first predetermined one of said groups and removing another command from the first predetermined one of said groups, whereby said command display means normally displays designations of the most recently selected commands.

4. A command input apparatus as claimed in claim 3, wherein:

when said command display means is displaying the designations of the first predetermined one of the groups, said command display means is responsive to the first command selection signal to display a second predetermined one of the groups, and said command display means is responsive to said priority order renewal means designating a command not presently within the first predetermined one of the groups for transferring a command from the first predetermined one of the groups to the second predetermined one of the groups, whereby the second predetermined one of the groups is made up of the commands most recently selected prior to the commands of the first predetermined one of the groups.

5. A command input apparatus according to claim 4, wherein the memory table includes a command table for storing a plurality of execution processes respectively to the stored commands, for storing data related to the stored processes, and for storing designations of the first and second predetermined ones of the groups of commands.

6. A command input apparatus according to claim 3, wherein the first command selection means comprises a particular key arranged on a keyboard of the command input apparatus.

7. A command input apparatus according to claim 3, wherein the first command selection means comprises a position data designation device for designating a particular position on the command display means.

8. A command input apparatus according to claim 3, wherein the second command selection means comprises a plurality of predetermined keys on a keyboard, each of the predetermined keys corresponding to a respective one of the commands displayed on the command display means.

9. A command input apparatus according to claim 3, wherein the second command selection means comprises a position data designation device for designating position data at which the selected command is displayed on the command display means.

10. A command input apparatus according to claim 3, wherein the memory table includes a command table for storing a plurality of execution processes corresponding respectively to the stored commands, for storing data related to the stored processes, and for storing designations of the commands in the first predetermined one of the groups of commands.

* * * * *